United States Patent [19]

Inaba et al.

[11] 4,263,988

[45] Apr. 28, 1981

[54] SPEED CONTROL SYSTEM FOR A MOTOR

[75] Inventors: Hiromi Inaba; Seiya Shima; Takeki Ando; Toshiaki Kurosawa; Hiroaki Kuroha, all of Ibaraki, Japan

[73] Assignee: Hitachi, Ltd., Tokyo, Japan

[21] Appl. No.: 957,093

[22] Filed: Nov. 3, 1978

[30] Foreign Application Priority Data

Nov. 4, 1977 [JP] Japan .................................. 52-131572

[51] Int. Cl.³ .......................... H02P 7/16; B66B 5/06
[52] U.S. Cl. .................................. 187/29 R; 318/143; 318/148; 318/317; 318/371
[58] Field of Search ............... 318/143, 146, 158, 268, 318/269, 272, 275, 303, 304, 317, 319, 350, 369, 371, 434, 461, 464, 465; 187/29 R

[56] References Cited

U.S. PATENT DOCUMENTS

| 3,961,688 | 6/1976 | Maynard | 187/29 R |
|---|---|---|---|
| 4,085,823 | 4/1978 | Caputo et al. | 187/29 R |
| 4,171,505 | 10/1979 | Shima et al. | 318/146 |

Primary Examiner—Truhe J. V.
Assistant Examiner—John W. Redman
Attorney, Agent, or Firm—Craig and Antonelli

[57] ABSTRACT

A speed control system for an elevator motor, comprising a D. C. motor for driving an elevator, a device which generates a speed command signal for the elevator, a speed dynamo which generates a speed signal corresponding to a speed of the elevator, a speed control device which adjusts an applied voltage to the motor according to the speed deviation between the speed command signal and the speed signal, an emergency stop device which subjects the elevator to braking when the speed deviation has exceeded a predetermined value, and a blind sector device which provides an output when the speed signal has exceeded a predetermined value and which negatively feeds it back to the speed control device.

20 Claims, 11 Drawing Figures

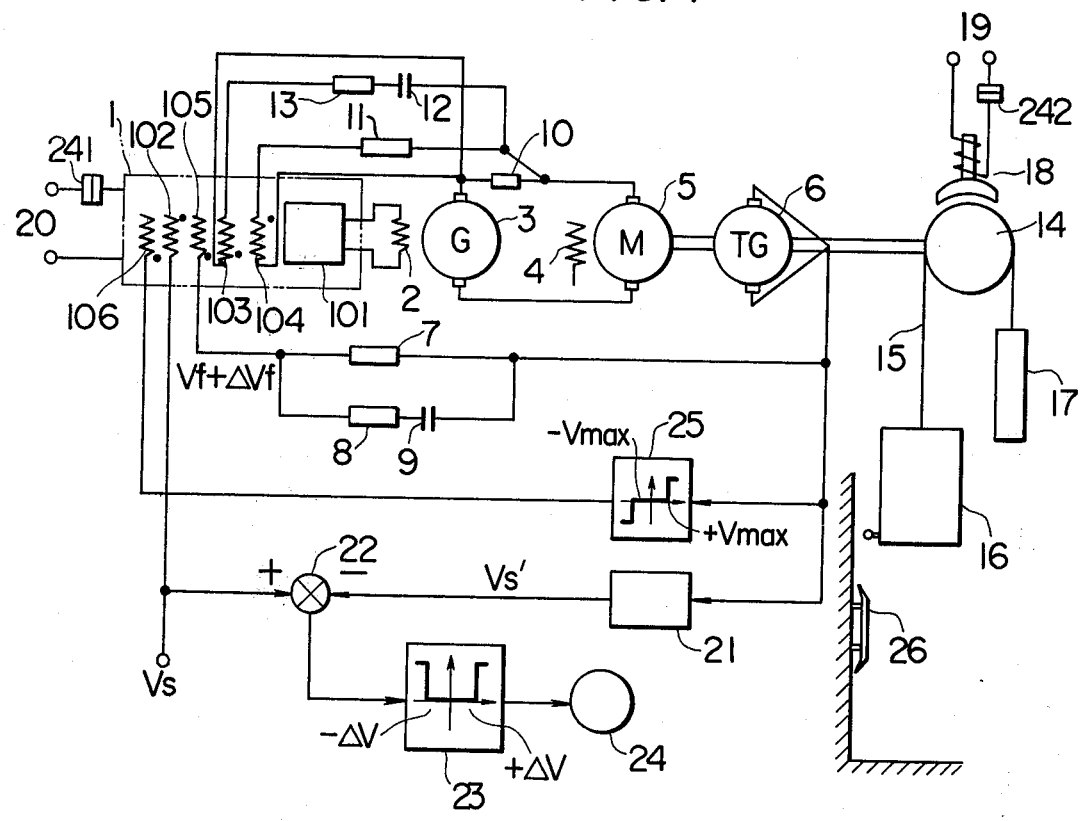

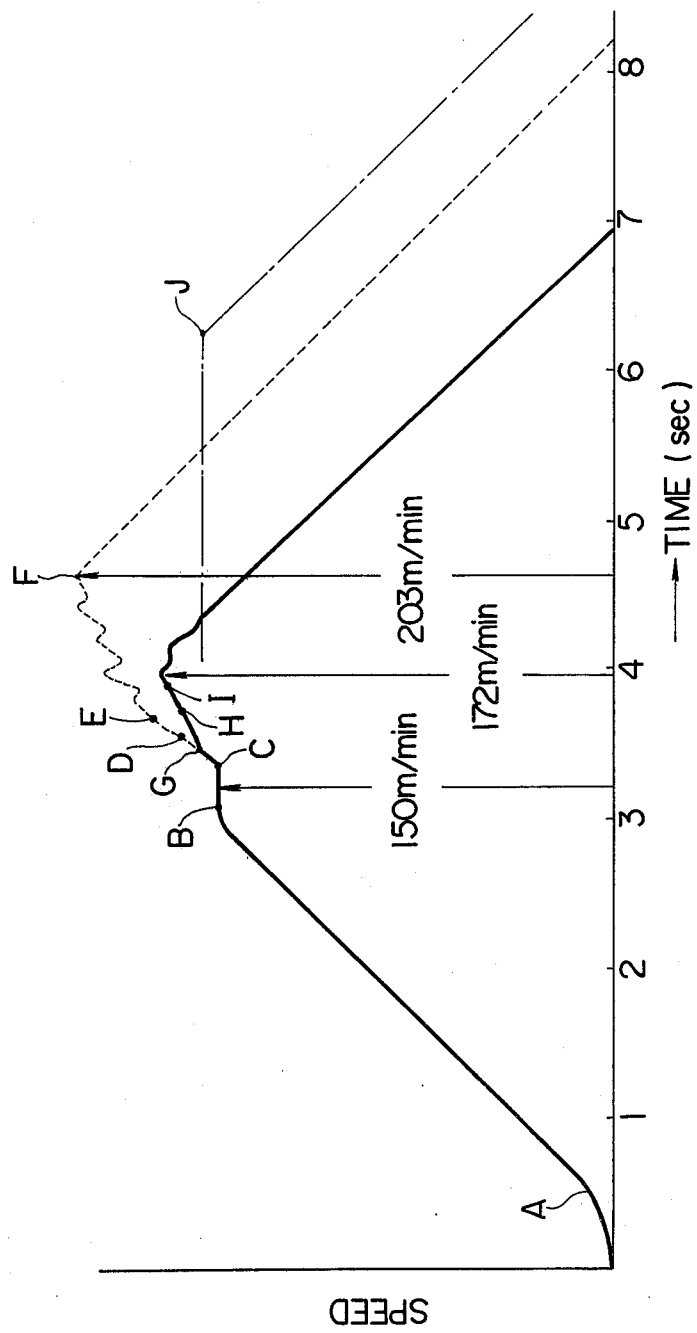

SPEED CONTROL SYSTEM FOR A MOTOR

BACKGROUND

This invention relates to a speed control system for a motor, and more particularly to improvements in motor control apparatus which is provided with a speed increase-suppressing device and which is suitable for use in elevators etc.

A control system employing semiconductor devices is extensively used for the speed control of a motor, and it is possible to execute a control which is highly reliable, precise and stable.

On the other hand, however, due to a quick response of the semiconductor, if any fault occurs in the control apparatus, there is the possibility that the motor will abnormally increase its speed in a short time. Especially in such a case where the use affects people's lives as in an elevator, the operation needs to be perfected with regard to the safety apparatus thereof.

A typical fault which causes the abnormal speed increase is the disconnection of a speed feedback circuit. The wiring itself can be prevented from being disconnected by, e.g., passing it through the interior of a pipe. However, in case where a feedback resistor in the feedback circuit is required, the disconnection of the resistor part is a problem. If the speed feedback circuit is disconnected, a speed deviation signal to enter the speed control apparatus becomes excessive, and the motor abruptly undergoes the abnormal speed increase.

As means for monitoring the abnormality of such a control system, there has been proposed a system wherein the speed deviation between a speed command and an actual speed is evaluated, and when the deviation has become greater than a predetermined value, the occurrence of the abnormality in the control system is judged, and the elevator is immediately stopped.

Even with this system, however, the fault such as the disconnection of the resistor of the speed feedback circuit is detected for the first time when the speed control apparatus provides an excessive output on account of the disconnection of the speed feedback circuit, with the result that the motor abnormally increases its speed. Therefore, the fault detection lags. Granting that there is no lag in the fault detection, a time lag is involved from the point of time of the detection to the time when a power source is turned "off" and when a brake demonstrates its braking force 100%. In case where, as in the fault of the disconnection of the speed feedback resistor, an abnormal acceleration after the fault is excessive, the elevator continues the speed increase during the time lag, and the maximum speed in the abnormal operation sometimes becomes as high as 130–150% of a rated speed.

An elevator is provided with mechanical emergency stop apparatus according to which, upon detecting by a mechanical governor that the speed of the elevator has abnormally increased to 120–130% of the rated speed, a part of an elevator car grasps a rail and is immediately stopped. The mechanical emergency stop apparatus is a protective means which is a "last resort" for the elevator. When this apparatus operates, there is the possibility that the passengers will be injured due to the sudden stop. Likewise, the elevator rail is damaged, and the restoration takes a long time. Accordingly, it is very desirable to decelerate the elevator before the mechanical emergency stop apparatus operates.

The abnormality monitoring means above described has a high probability of actuating the mechanical emergency stop apparatus, and cannot be said to be a satisfactory system in this respect.

As another expedient for monitoring the abnormality of the control system set forth above, it has been proposed to suppress the speed increase of the motor upon detecting the increase of the armature current of the motor.

This system, however, is disadvantageous in that the setting of the armature current value at which the abnormality is detected is difficult and the abnormality cannot be properly sensed.

Further, there is a third system wherein the deviation between a speed command and a speed feedback signal is entered into a blind sector circuit, and the resultant output is negatively fed back to the speed control apparatus, whereby when the speed deviation has become great, the output of the speed control apparatus is reduced, thus intending to suppress the speed increase of the motor.

In this system, there are speed deviation values which develop both in the normal operation and the abnormal operation. The abnormality cannot be properly sensed.

SUMMARY

The principal object of this invention is to provide a speed control system for a motor which can promptly suppress any abnormal speed increase of the motor.

The main feature of this invention consists in disposing a device which suppresses an output of the speed control apparatus in response to the fact that a speed signal corresponding to the speed of the motor has exceeded a predetermined value.

Owing to such a construction, the abnormal increase of the motor speed ascribable to, e.g., the abnormality of the motor speed control system, can be suppressed, and the safety of the apparatus can be secured until a protective operation by another abnormality detection means is executed.

The second feature of this invention consists in juxtaposing emergency stop apparatus which subjects the motor to braking when the speed deviation between a speed command signal and a speed signal has exceeded a first predetermined value, and a device which suppresses an output of the speed control apparatus when the speed signal has exceeded a second predetermined value.

With such a construction, the emergency stop apparatus for detecting the abnormality of the speed control system can be set so as to detect only the certain abnormality, and therewith, the safety of the apparatus can be secured until the effect of the emergency stop apparatus appears.

Other objects and features of this invention will become apparent from the following description of embodiments.

DRAWINGS

FIG. 1 is a constructional view of an embodiment in which the speed control system for a motor according to this invention is applied to an elevator, FIG. 2 is a graph of elevator speed curves versus time for explaining the operation of this invention, FIGS. 3 to 5 are circuit diagrams each showing a concrete example of a blind sector circuit, FIGS. 6 to 8 are constructional views each showing an embodiment of this invention, FIGS. 9 and 10 are are circuit diagrams each showing an absolute-value blind sector circuit in a concrete form, and FIG. 11 is a circuit diagram of an example of an armature current-monitoring device.

DETAILED DESCRIPTION

Figure 6:
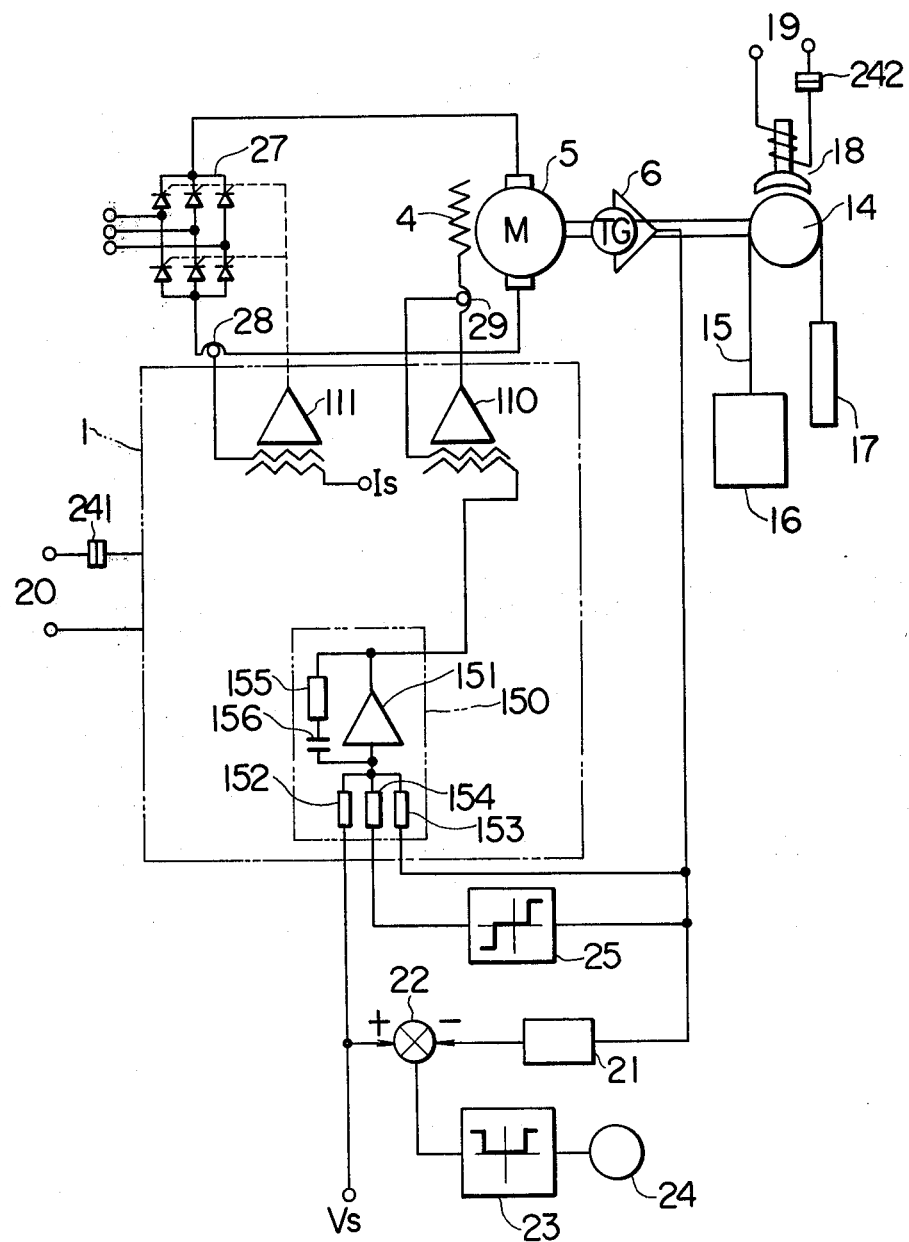

FIG. 1 is a schematic constructional view of a preferred embodiment of this invention.

Referring to the figure, numeral 1 designates speed control apparatus. Basically, it receives a speed command signal $V_s$ and a speed feedback signal $V_f$ and excites a dynamo field winding 2 according to the deviation between them. Usually, it includes a thyristor amplifier. In the drawing, however, it is schematically shown in the form of a magnetic amplifier 101 having control windings 102–106. An armature 3 of a D.C. generator constitutes a Ward-Leonard circuit along with an armature 5 of a D.C. motor having a field winding 4. An output of a speed generator 6 becomes the speed feedback signal $V_f$ through a feedback resistor 7, and also becomes a speed damping signal $\Delta V_f$ through a resistor 8 and a capacitor 9 which make up a damping circuit. The sum of these signals, $V_f + \Delta V_f$ is negatively fed back to the control winding 105 of the speed control apparatus 1. The armature current of the motor is detected by a shunt 10, and is positively fed back to the control winding 104 through a feedback resistor 11. This constructs a load compensation circuit which compensates for a change of an armature load for the speed control system. A capacitor 12 and a resistor 13 are disposed in order to prepare an armature current damping signal and to negatively feed it back to the control winding 103.

An elevator sheeve 14 is coupled with the motor armature 5, and an elevator car 16 and a counterweight 17 are suspended through a rope 15. Numeral 18 indicates a magnet brake for stopping and holding the elevator moving system, and the magnet brake is kept excited by a power source 19 during the operation of the elevator.

Shown at 20 is a power source for the speed control apparatus 1.

Protective means as stated below is disposed for the speed control system as described above.

Numeral 21 designates a simulator circuit which simulates the transfer function of the speed control system from the output voltage of the speed dynamo 6 in an inverse calculation fashion, to make an approximation signal $V_s'$ of the speed command signal at that time. Accordingly, unless there is any abnormality in the speed control system, it ought to hold that $V_s \approx V_s'$. The simulator circuit 21 may have quite the same arrangement as that of the speed feedback circuit consisting of the resistors 7 and 8 and the capacitor 9. Numeral 22 indicates a comparator, which calculates $V_s - V_s'$. From the above assumption, if the speed control system is normal, $V_s - V_s' \approx 0$. If any abnormality occurs in the speed control system, then $(V_s - V_s')$ exceeds a predetermined value $|\Delta V|$. Shown at 23 is an absolute-value blind sector circuit which energizes a relay 24 when the output $(V_s - V_s')$ of the comparator 22 has exceeded the predetermined value $|\Delta V|$. Upon energization of the relay 24, its contacts 241 and 242 are opened to cut off the power source of the speed control apparatus 1 and to cut off the excitation of the magnet brake 18, so that an emergency braking is applied to the elevator moving system.

Thus, emergency stop apparatus is constructed. It is also possible to endow the simulator circuit 21 with a function of simulating the actual speed from the speed command signal $V_s$ and situate it between a position of the signal $V_s$ and the comparator 22, or to omit such simulation means.

Shown at 25 is a second blind sector circuit. When the output of the speed dynamo 6 has exceeded a second predetermined value $V_{max}$, the second blind sector circuit 25 provides an output and negatively feeds it back to the control winding 106 of the speed control apparatus 1. The second predetermined value $V_{max}$ is set to be higher than the rated speed of the elevator.

The operation of the embodiment in FIG. 1 will now be explained.

The power sources 19 and 20 are closed to excite the magnet brake 18 and to energize the speed control apparatus 1. Under this state, the speed command signal $V_s$ of the elevator is entered into the control winding 102 of the speed control apparatus 1. The generator 3 produces a voltage responsive to the speed command signal, and supplies it to the motor 5. Thus, the motor 5 produces a driving torque and starts the elevator car 16. Simultaneously, the speed generator 6 is rotated to negatively feed the speed and the differentiated value of the speed back to the winding 103. Since an armature current flows, a signal proportional thereto is positively fed back to the winding 104. Further, the differentiated signal of the armature current is negatively fed back to the winding 103. As a result, the elevator car 16 is operated at a speed following up the speed command signal $V_s$.

As long as the speed control system is normally operating in this manner, the output of the comparator 22 maintains $V_s - V_s' \leq |\Delta V|$. Also the elevator speed lies within the rated speed, so that the value $V_{max}$ is not exceeded.

Here, consider a case where the speed feedback resistor 7 has been disconnected. Then, the speed feedback signal $V_f$ becomes zero, the speed control apparatus 1 generates a very great output, an excessive armature current begins to flow, and the motor increases the speed. As a result, the output voltage of the speed generator 6 increases and is compared with the speed command signal $V_s$ through the simulator circuit 21, so that $V_s - V_s' > |\Delta V|$ is established and that the relay 24 is energized. Accordingly, the contact 241 is opened to turn "off" the power source of the speed control apparatus 1, and the contact 242 is opened to cut off the excitation of the magnet brake 18. Thus, the elevator moving system is braked, and the elevator is immediately stopped.

Supposing that the abnormality has occurred during the running of the elevator at the rated speed, the elevator speed increases up to 130–150% of the rated speed before the cutoff of the power source of the speed control apparatus 1 is executed and before the magnet brake 18 demonstrates its braking force of 100%. The second blind sector circuit 25 suppresses such a speed increase. Now, assume a case where the speed level at which the blind sector circuit 25 provides an output is set at 105% of the rated speed. Then, when the elevator speed has exceeded 105% of the rated speed under the state under which the speed control apparatus 1 is still alive, the output of the blind sector circuit is negatively fed back to the control winding 106. Accordingly, the speed control apparatus 1 operates so as to diminish its output and functions so as to suppress the motor speed. In consequence, the elevator speed does not exceed 105% of the rated speed, and the braking force owing to the magnet brake 18 becomes effective in the meantime. Thus, the elevator can immediately stop without exceeding 105% of the rated speed.

In addition to the emergency stop apparatus described above, the elevator is usually provided with end floor stop apparatus which prevents the elevator car from going beyond the upper and lower end floors in the ascending and descending strokes thereof. This apparatus is such that a position detector 26 is disposed at the end of each of the ascending and descending strokes and that the elevator is forcibly braked and stopped by utilizing the speed control apparatus 1 on the basis of the output signal of the detector. Accordingly, even when the emergency stop apparatus is omitted, the elevator whose speed is suppressed to 105% of the rated speed can be stopped in the vicinity of the end floor.

The situation above stated will be explained with reference to FIG. 2 which illustrates experimental results concerning an elevator of a rated speed of 150 m/min.

The elevator which has initiated an acceleration from a point A gets at the rated speed of 150 m/min at a point B after about 3 seconds, and begins a constant-speed running. Assuming that the speed feedback resistor 7 has been disconnected at a point C, the motor 5 provides a great output and abnormally accelerates the elevator car at an acceleration greater than the acceleration in the normal operation (gradient between the points A and B). The figure takes as an example the so-called full-load descent operation in which the elevator car is lowered carrying a full load of passengers. Here, in case where the blind sector circuit 25 in FIG. 1 is not disposed, the speed reaches as high as 203 m/min (about 135% of the rated speed) as indicated a broken line. More specifically, the blind sector circuit 23 of the emergency stop apparatus provides an output at a time D (detects the abnormality at this time). Due to a series of operation lags (operation lags of the relay, the contactor and the magnet brake), however, a loss time of 0.1–0.2 sec is attendant before a point of time E at which the magnet brake begins to work. Although, at the point E, the motor 5 has already generated a braking torque, it further continues to increase the speed due to an unbalance torque based on the pull of the load. Eventually, the speed of 203 m/min (135% of the rated speed) is reached at a point F at which the electromagnetic braking torque of 100% acts.

As previously stated, the elevator is provided with the mechanical protective device which operates at 120–130% of the rated speed. Under this condition, it is certain that the protective device operates. As described before, the mechanical protective device is attended with the danger of injuring the passengers, and moreover, once it has operated, a long time is required for the restoration.

In contrast, when the blind sector circuit 25 in FIG. 1 is disposed according to this invention, the speed can be suppressed to below 172 m/min (115% of the rated speed).

More specifically, supposing a case where the blind sector circuit 25 is set so as to provide an output at 105% of the rated speed, when the abnormality has occurred at the point C, the same acceleration as above stated is effected until a point of time G at which the speed of 105% of the rated speed is reached. However, when the acceleration beyond the point G is intended, the blind sector circuit 25 produces a great output and an intense negative feedback acts on the control winding 106 of the speed control appparatus 1. Consequently, the output of the speed control apparatus 1 suddenly decreases to abruptly lower the voltage of the dynamo 3. Therefore, the motor 5 changes so as to function as a dynamo, and a regenerative braking torque is produced. In this way, the elevator is subjected to the electric braking at an early stage, and the speed increase thereof is sharply suppressed. It is the same as in the foregoing case that the emergency stop apparatus operates at a point H and that the magnet brake begins to work at a point I. The braking torque is substantially the same beyond the point H. According to the experiment, however, in consequence of the suppression of the acceleration of the section $\overline{GD}$ to the acceleration of the section $\overline{GH}$, the subsequent acceleration is also suppressed, and a speed suppressing effect as indicated by a solid line can be demonstrated.

By making large the gain of the speed suppressing system owing to the blind sector circuit 25, it is also possible to suppress the abnormal acceleration near to zero. In this case, the speed of e.g. 105% is kept as indicated by a one-dot chain line, so that the emergency stop apparatus does not operate. However, when the elevator enters the operating zone of the end floor stop apparatus at a point J it is decelerated and stopped, and hence, there is no danger.

Although, in the above, description has been made of the Ward-Leonard circuit, it goes without saying that the same applies to a static Leonard circuit in which two sets of positive and negative thyristor converters are used instead of the generator 3.

FIGS. 3 to 5 are diagrams each showing a concrete arrangement of the blind sector circuit 25. In the arrangement of FIG. 3, the voltages of power sources $E_1$ and $E_2$ are set at a vlue of a rise point, e.g. 105% of the rated speed. Then, when a voltage overcoming the voltage value is applied, a diode $D_1$ or $D_2$ in the forward direction turns "on," and the blind sector characteristic is demonstrated.

With the arrangement in FIG. 4, the circuit can be simply constructed by selecting the zener voltages of zener diodes $DZ_1$ and $DZ_2$ to a rise point. The arrangement in FIG. 5 exploits the blocking layer voltages of diodes $D_1$–$D_N$ and $D_1'$–$D_N'$, and can select the rise point as desired by varying the number N of the diodes.

The blind sector elements themselves do not have any amplifying action. Therefore, in case where the gain of the speed increase suppression is insufficient, the number of turns of the control winding 106 may be increased, or an operational amplifier or the like may be additionally provided before or behind the blind sector element 25.

FIG. 6 shows another embodiment. This is an example in which this invention is applied to a control system wherein a motor is caused to generate positive and negative torques by controlling an armature current in one direction and a field winding current in both positive and negative directions.

In the figure, numeral 27 designates a thyristor converter, which supplies current to a motor armature 5 in only one direction. On the other hand, a motor field winding 4 is supplied with currents in both the positive and negative directions by means of an amplifier 110 which includes e.g. a magnetic amplifier and a thyristor converter. Speed control apparatus 1 consists of a preamplifier 150, the amplifier 110 disposed at a stage succeeding thereto, and a magnetic phase shifter 111 or the like for controlling the armature current. An armature current command $I_s$ and an output of an armature current detector 28 are compared, and the thyristor converter 27 is phase-controlled according to the deviation between them. The preamplifier 150 is composed of an operational amplifier 151, input resistors 152–154, and a feedback resistor 155 and a feedback capacitor 156 for proportional integration. A speed command $V_s$ is given to the input resistor 152, a speed feedback signal is given to the input resistor 153, and an output of a blind sector element 25 is given to the input resistor 154. The amplifier 110 forms a field winding current-control system which compares an output of the preamplifier 150 and an output of a field winding current detector 29 and removes the deviation between them.

Here, in order to eliminate a steady deviation due to a load change, the proportional integration element is disposed in the form of the preamplifier 150 in the speed control apparatus 1 and at a stage preceding to the current control devices 110 and 111. In this embodiment, therefore, the output of the blind sector element 25 is negatively fed back to the preamplifier 150. For the circuit which needs to dispose the preamplifier 150 in the speed control apparatus 1 in this manner, one resistor 154 is added instead of providing the control winding 106 in FIG. 1, whereby the speed increase-suppressing effect can be enhanced inexpensively.

Although, in FIG. 6, the output of the blind sector circuit 25 is negatively fed back to the preamplifier 150, the same effect is of course attained when it is negatively fed back to a control winding added anew to the current control device 110. In this regard, since the example of using the magnetic phase shifter as the phase shifter of the current control device is illustrated here, such a control winding must be added anew in this system. However, when a phase shifter utilizing an IC or transistors is used, the price scarcely rises.

Figure 7:
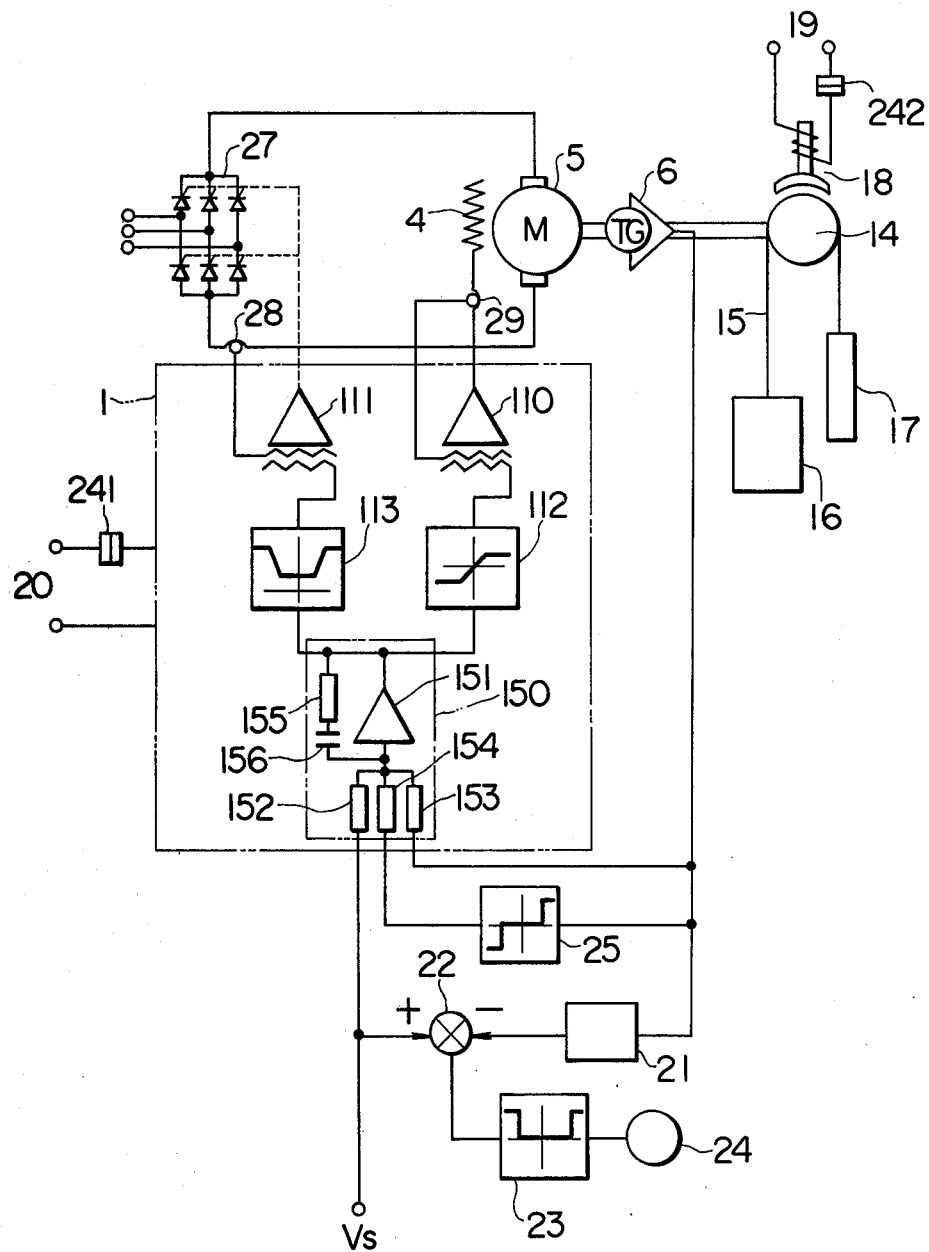

The preamplifier 150 is also required in a control system wherein, as illustrated in FIG. 7, function generators 112 and 113 are located in the speed control apparatus 1, and when a torque command (which may be deemed a speed deviation) is small the armature current is held constant and the field winding current is changed in both the positive and negative directions, while when the torque is great the field winding current is held constant at a positive or negative rated value and the armature current is increased in one direction. Also in this case, the same effect as in the case of FIG. 6 can be achieved by entering the output of the blind sector element 25 into the preamplifier.

Figure 8:
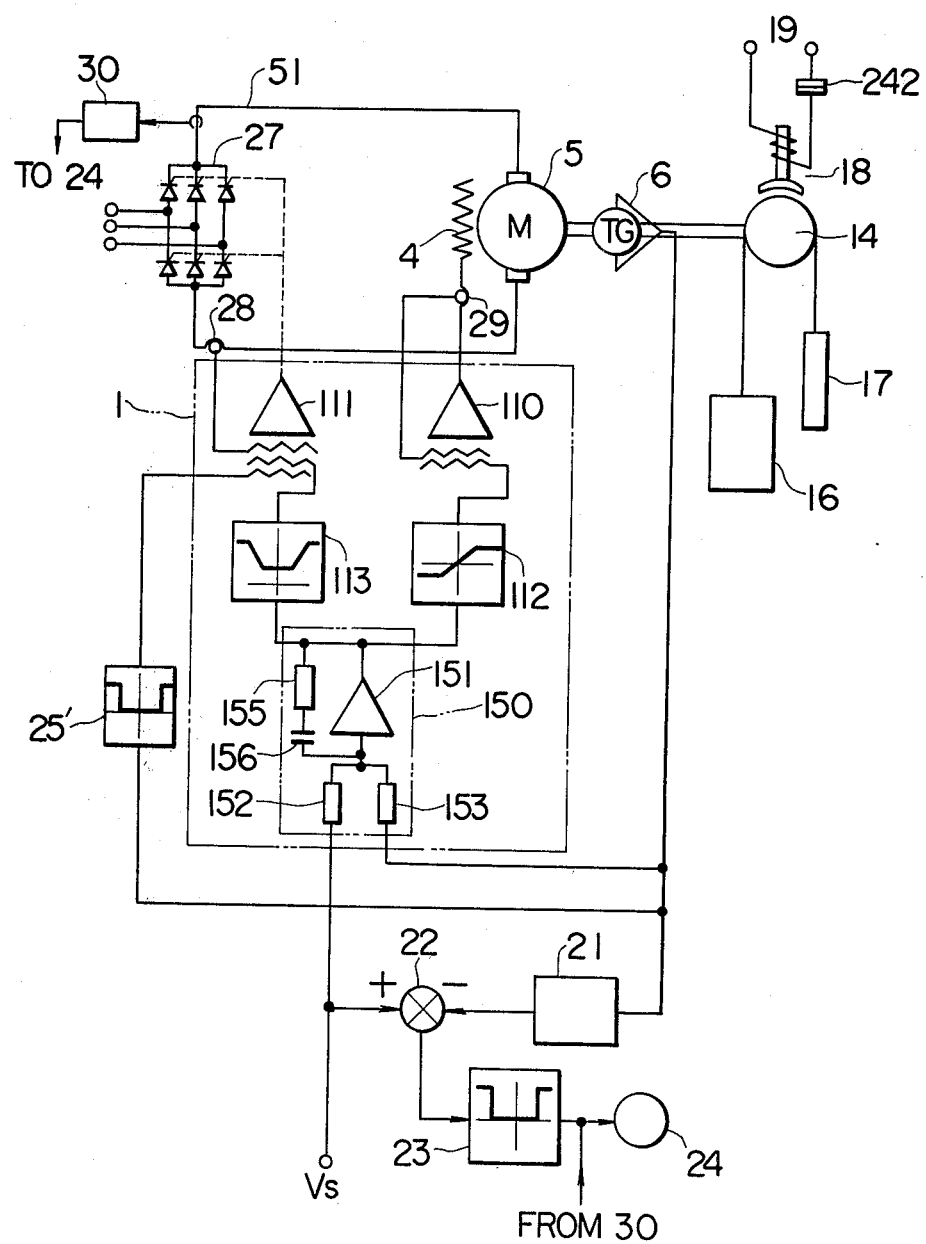

In the circuit of FIG. 7, the time when the motor produces an abnormal great torque on account of a fault is limited to the case where the field winding current becomes constant at the rated value and the armature current increases as described previously. In case of such a circuit system, the increase of the armature current may be suppressed. Therefore, as illustrated in FIG. 8, the speed signal may be negatively fed back to only the current control device 111 through an absolute-value blind sector element 25'. Thus, the abnormal speed increase of the motor can be suppressed. This embodiment has another effect that even in case of a fault in which the preamplifier 150 itself becomes abnormal, the effect of suppression is not lost.

In each of the above embodiments, the input signal to the blind sector element 25 or 25' is the output of the speed generator 6 for speed feedback. Of course, however, the effect can be enhanced more when an auxiliary speed dynamo is separately disposed in consideration of any fault of the speed dynamo 6 and its signal is employed or the greater value of the signals of both the dynamos is employed. Since, in the circuit system of FIG. 8, the feedback signal may be in one direction, it is allowed to employ an inexpensive A.C. speed dynamo for the auxiliary speed dynamo and to rectify its output and then pass the rectified output through the blind sector element.

Figure 9:
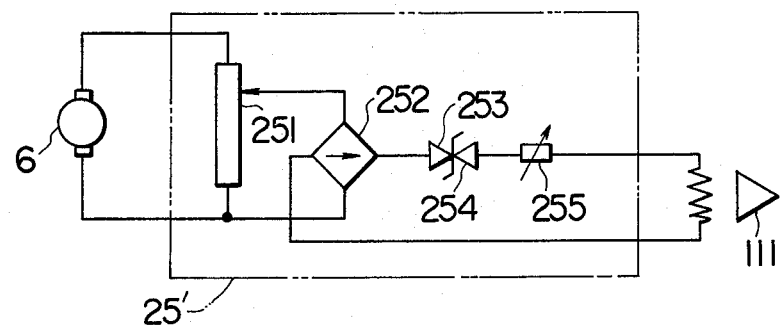
Figure 10:
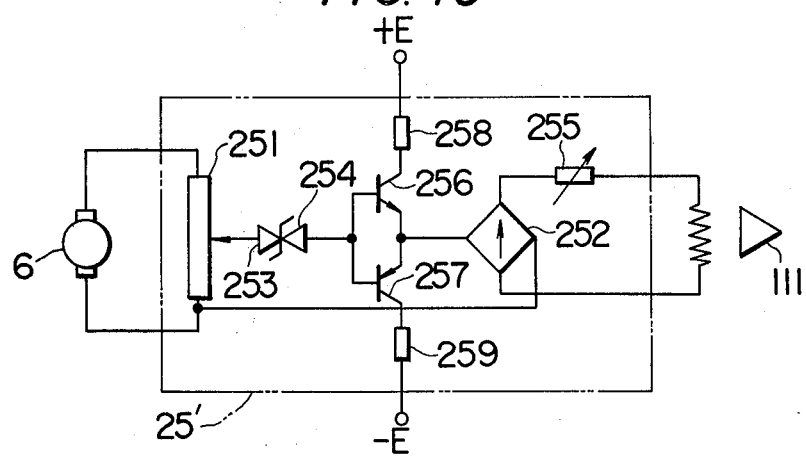

Examples of concrete circuits of the absolute-value blind sector element 25' are shown in FIGS. 9 and 10. Referring to FIG. 9, an output voltage of a speed dynamo 6 is applied to a resistor 251 and is corrected into an appropriate operating voltage level, whereupon it is rectified by a full-wave rectifier 252. The output of the rectifier is transmitted to a control winding of an armature current-controlling phase shifter 111 through zener diodes 253 and 254 and an operating current-adjusting resistor 255. In case of this circuit, the number of turns of the control winding must be increased to attain a necessary gain, but there are the effects that the circuit arrangement is simple and that the reliability is high.

In FIG. 10, a voltage of a speed dynamo 6 is passed through an operating level-setting circuit composed of a resistor 251 and zener diodes 253 and 254, whereupon it is amplified by transistors 256 and 257 and rectified by a rectifier 252. $+E$ and $-E$ designate positive and negative control power sources, and numerals 258 and 259 indicate resistors. According to this circuit arrangement, a great current is obtained as the speed increase suppression-command current.

The embodiment of FIG. 8 is provided with emergency stop apparatus which includes an armature current-monitoring device 30 and in which when the armature current is smaller than a predetermined value, an abnormality detection signal is transmitted from the monitor device 30 to energize the foregoing relay 24.

More specifically, when the blind sector circuit 25' provides an output and negatively feeds it back to the armature current control system, the armature current is suppressed to be lower than in the usual state, whereby the speed suppression is executed. Accordingly, in case where the armature current has become smaller than the predetermined value, this is detected by the current monitoring device 30 and the elevator is brought into the emergency stop. In the case of providing the combination of the current monitoring device 30 and the relay 24, it is possible to omit the devices 21, 22 and 23.

Figure 11:
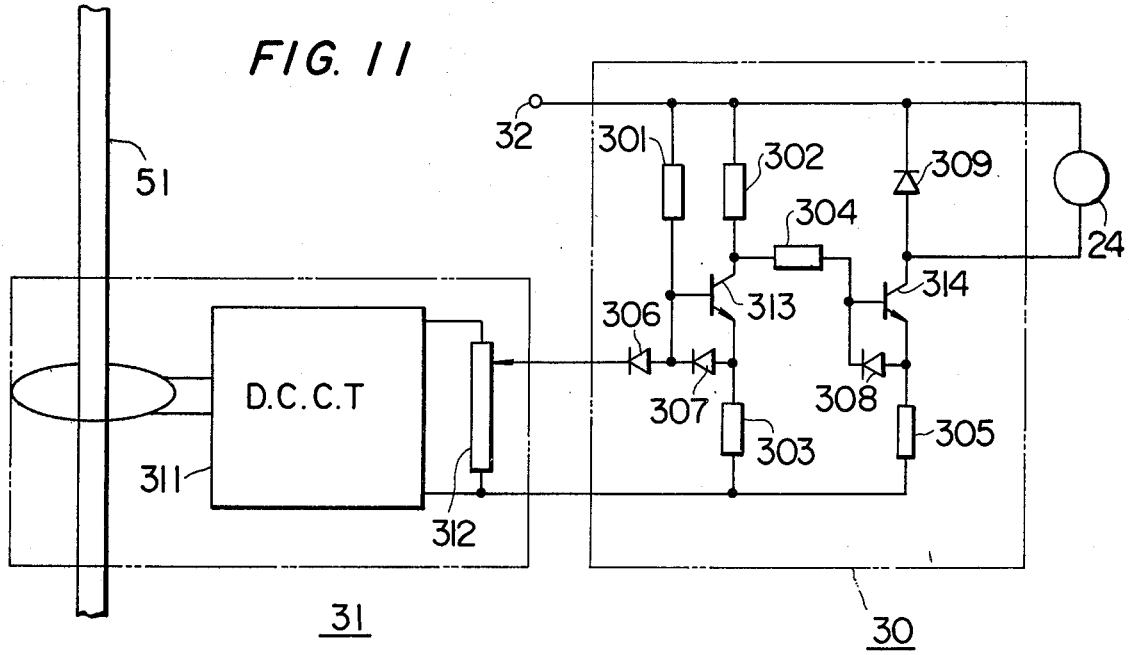

FIG. 11 is an electric circuit diagram of a concrete example of the current monitoring device 30. Numeral 31 indicates a current detector which detects the armature current flowing through an armature circuit 51. In the current detector, a voltage proportional to the armature current is applied from a D.C. current transformer 311 to an output resistor 312. The current monitoring device 30 is constructed of resistors 301–305, diodes 306–309 and transistors 313 and 314. Shown at 32 is the positive polarity of a power source.

Now, the operation will be briefly explained. When the voltage derived from the variable resistor 312 is greater than a predetermined value, the transistor 313 turns "on" and the transistor 314 turns "off," and no current flows through the relay 24 and this relay is "off." In contrast, when the voltage derived from the variable resistor 312 becomes smaller than the predetermined value, the transistor 313 turns "off" and the transistor 314 turns "on," and the relay 24 turns "on." The level comparison in this regard is decided by the setting of the resistance value of the resistor 312.

Accordingly, only in case where the armature current flowing through the armature circuit 51 is at or above the level which poses no problem in the generation of a motor torque, a sequence circuit necessary for the elevator operation is activated to permit the running of the elevator. In the abnormal situation such as fault under which the armature current is very small or zero and only the field winding current flows in response to the command (the torque generated by the motor is close to zero), it is possible to prevent the elevator from being operated.

In the above, there have been described the examples in which the magnetic phase shifter is utilized as the phase shifter of the current control devices 110 and 111 of the speed control apparatus 1. Needless to say, however, the speed suppressing effect previously stated can be demonstrated even when a phase shifter exploiting an IC or transistors is adopted.

Although only the speed control of the D.C. motor has been explained, this invention is applicable to speed controls of an A.C. motor and other motors.

Further, one or both of the speed signal to enter the speed control apparatus and the speed signal to enter the blind sector element can also be obtained by various procedures or devices other than the speed dynamo. For example, they can be obtained from an armature voltage and an armature current in the case of the D.C. motor.

In accordance with this invention, the speed increase of the motor in an abnormality can be suppressed at an early stage.

We claim:

1. A speed control system for an elevator comprising:
a motor for driving an elevator;
a magnet brake for holding said motor in a stop state;
means for generating a speed command signal for said elevator;
means for generaging a speed signal corresponding to a speed of said elevator;
speed control apparatus which controls a speed of said motor according to a deviation between the speed command signal and the speed signal; and
a blind sector device which is electrically connected between said speed signal generating means and said speed control apparatus and provides a feed-back signal which suppresses an output of said speed control apparatus when said speed signal exceeds a predetermined value which is set to be higher than a rated speed of the elevator.

2. The speed control system for an elevator as defined in claim 1, wherein said motor is a D.C. motor, and said speed control apparatus includes a D.C. dynamo which is in the Ward-Leonard connection with said D.C. motor.

3. The speed control system for an elevator as defined in claim 1, wherein said motor is a D.C. motor, and said speed control apparatus includes a thyristor converter which supplies power to an armature of said D.C. motor.

4. The speed control system for an elevator as defined in claim 3, wherein said thyristor converter is constructed so as to cause current to flow through said armature of said D.C. motor in only one direction, and said speed control apparatus includes means for causing currents to flow through a field winding of said D.C. motor in both positive and negative directions.

5. The speed control system for an elevator as defined in claim 4, wherein said speed control apparatus comprises an armature current-control device which controls the armature current to be constant, and a field winding current-control device which adjusts the field winding current of said motor according to said deviation.

6. The speed control system for an elevator as defined in claim 4, wherein said speed control apparatus includes an armature current-control device which holds the armature current constant when the deviation is at most a predetermined value and which adjusts the armature current according to the deviation when said deviation exceeds said predetermined value, and a field winding current-control device which adjusts the field winding current according to the deviation when said deviation is at most said predetermined value and which holds the field winding current when the deviation exceeds said predetermined value.

7. The speed control system for an elevator as defined in claim 5, wherein said speed control apparatus includes a preamplifier which enters the speed command signal, the speed signal and the feedback signal into said current control devices.

8. The speed control system for an elevator as defined in claim 7, wherein said preamplifier includes a proportional integration element.

9. The speed control system for an elevator as defined in claim 6, wherein the feed-back signal is negatively entered into said armature current-control device.

10. The speed control system for an elevator as defined in claim 9, wherein said blind sector device is an absolute-value blind sector element which, when the speed signal exceeds the positive or negative predetermined value, provides a feed-back signal of the same polarity and which negatively feeds it back to said armature current-control device.

11. A speed control system for an elevator comprising:
a motor for driving an elevator;
a magnet brake for holding said motor in a stop state;
means for generating a speed command signal for said elevator;
means for generating speed corresponding to a speed of said elevator;
speed control apparatus which controls a speed of said motor according to a deviation between the speed command signal and the speed signal;
emergency stop apparatus which actuates said magnet brake when said deviation exceeds a first predetermined value; and
a blind sector device which is electrically connected between said speed signal generating means and said speed control apparatus and provides a feed-back signal which suppresses an output of said speed control apparatus when the speed signal exceeds a second predetermined value which is set to be higher than a rated speed of the elevator.

12. The speed control system for an elevator as defined in claim 11, wherein said motor is a D.C. motor, and said speed control apparatus includes a D.C. dynamo which is in the Ward-Leonard connection with said D.C. motor.

13. The speed control system for an elevator as defined in claim 11, wherein said motor is a D.C. motor, and said speed control apparatus includes a thyristor converter which supplies power to an armature of said D.C. motor.

14. The speed control system for an elevator as defined in claim 13, wherein said thyristor converter is constructed so as to cause current to flow through said armature of said D.C. motor in only one direction, and said speed control apparatus includes means for causing currents to flow through a field winding of said D.C. motor in both positive and negative directions.

15. The speed control system for an elevator as defined in claim 14, wherein said speed control apparatus comprises an armature current-control device which controls the armature current to be constant, and a field winding current-control device which adjusts the field winding current of said motor according to the deviation.

16. The speed control system for an elevator as defined in claim 14, wherein said speed control apparatus includes an armature current-control device which holds the armature current constant when the deviation is at most a predetermined value and which adjusts the armature current according to the deviation when said deviation exceeds said predetermined value, and a field winding current-control device which adjusts the field winding current according to the deviation when said deviation is at most said predetermined value and which holds the field winding current when the deviation exceeds said predetermined value.

17. The speed control system for an elevator as defined in claim 15, wherein said speed control apparatus includes a preamplifier which enters the speed command signal, the speed signal and the feed-back signal into said current control devices.

18. The speed control system for an elevator as defined in claim 17, wherein said preamplifier includes a proportional integration element.

19. The speed control system for an elevator as defined in claim 16, wherein the feed-back signal is negatively entered into said armature current-control device.

20. The speed control system for an elevator as defined in claim 19, wherein said blind sector device is an absolute-value blind sector element which, when the speed signal exceeds the positive or negative predetermined value, provides a feed-back signal of the same polarity and which negatively feeds it back to said armature current-control device.

* * * * *